(12) United States Patent
Adelman (10) Patent No.: US 8,572,887 B2
(45) Date of Patent: Nov. 5, 2013

(54) COLLAPSIBLE LURING DREDGE DEVICE

(76) Inventor: Richard J. Adelman, Newtown, PA (US)

( * ) Notice: Subject to any disclaimer, the term of this patent is extended or adjusted under 35 U.S.C. 154(b) by 54 days.

(21) Appl. No.: 12/931,449

(22) Filed: Feb. 1, 2011

(65) Prior Publication Data

US 2011/0192071 A1 Aug. 11, 2011

Related U.S. Application Data

(60) Provisional application No. 61/337,976, filed on Feb. 5, 2010.

(51) Int. Cl.
*A01K 85/18* (2006.01)
*A01K 85/00* (2006.01)

(52) U.S. Cl.
USPC ........... 43/42.74; 43/42.33; 43/42.06; 74/527

(58) Field of Classification Search
USPC ............... 43/27.4, 42.33, 42.34, 42.74, 43.1, 43/43.15, 105, 42.06, 44.83, 44.84; 74/527; 403/166
IPC ..................................... A01K 85/18
See application file for complete search history.

(56) References Cited

U.S. PATENT DOCUMENTS

| 132,476 | A | * | 10/1872 | Livaudais | 43/105 |
|---|---|---|---|---|---|
| 458,456 | A | * | 8/1891 | Hefftner | 43/105 |
| 1,036,574 | A | * | 8/1912 | Crane | 43/105 |
| 2,165,516 | A | * | 7/1939 | Stein et al. | 43/105 |
| 2,196,472 | A | * | 4/1940 | Moriarty | 43/21.2 |
| 2,652,656 | A | * | 9/1953 | Glasser | 43/105 |
| 2,728,164 | A | * | 12/1955 | Mears | 43/105 |
| 2,780,023 | A | * | 2/1957 | Mercier | 43/42.74 |
| 2,840,672 | A | * | 6/1958 | Martin | 200/565 |
| 3,646,700 | A | * | 3/1972 | Pond | 43/42.74 |
| 4,561,206 | A | * | 12/1985 | Lowrance et al. | 43/43.11 |
| 4,893,432 | A | * | 1/1990 | Rosengrant | 43/42.74 |
| 4,956,935 | A | * | 9/1990 | Riddell | 43/105 |
| 5,737,869 | A | * | 4/1998 | Murguido | 43/100 |
| 6,000,166 | A | * | 12/1999 | Kirkpatrick | 43/42.74 |
| 6,196,568 | B1 | * | 3/2001 | Stevens | 280/304.1 |
| 6,493,985 | B2 | * | 12/2002 | Matches et al. | 43/105 |
| 7,412,795 | B2 | * | 8/2008 | Glynn et al. | 43/42.74 |
| 7,841,129 | B2 | * | 11/2010 | Blackshear, Jr. | 43/44.99 |
| 2005/0050790 | A1 | * | 3/2005 | Higgins | 43/42.74 |

OTHER PUBLICATIONS

Reel-Time Forums, Homade BFT Teasers, Mar. 6, 2006, p. 1.*

* cited by examiner

*Primary Examiner* — Darren W Ark
*Assistant Examiner* — Timothy Schwarz
(74) *Attorney, Agent, or Firm* — Armand M. Vozzo, Jr.

(57) ABSTRACT

A collapsible luring dredge device includes a hub assembly having a plurality of separate hub sections each adapted to hold an extended spreader bar and together joined into a stacked unit assembled along a central axis with a pair of spring-loaded detents disposed within the stacked unit on opposite sides of the central axis. Inner surfaces of the hub sections at each end of the hub assembly are formed with a plurality of concave cavities arranged in a circular pattern intended to engage the detents as the hub sections are selectively rotated about the central axis. The hub assembly may thus be moved through a set of registered positions between a deployed configuration wherein the spreader bars are maintained in a substantially radial pattern for trolling use and a folded configuration wherein the bars are substantially aligned for storage.

17 Claims, 6 Drawing Sheets

COLLAPSIBLE LURING DREDGE DEVICE

CROSS-REFERENCE TO RELATED APPLICATION

This application is a continuation-in-part of provisional patent application Ser. No. 61/337,976 filed Feb. 5, 2010 for Collapsible Luring Dredge Device.

BACKGROUND OF THE INVENTION

The present invention relates generally to trolling lures that are used in connection with fishing vessels to attract fish to the surface of the water to facilitate a catch, and more particularly to an improved collapsible luring dredge wherein a plurality of separate hub sections each adapted to hold an extended spreader bar is joined into a stacked hub assembly with spring-loaded detents operatively disposed therein so that the hub sections may rotate and lock independently into registered positions and thereby move the dredge between a deployed configuration wherein the spreader bars are maintained in a radial pattern for trolling use and a folded configuration wherein the bars are aligned for storage.

Sport fishing in freshwater and saltwater is extremely popular around the world and provides enjoyment and competition to millions of enthusiasts. Essential to sport fishing, artificial lures intended to simulate live bait in their appearance and movement have long been used and are found in a variety of styles, designs and arrangements suitable for casting and trolling. Trolling lures used commonly in offshore fishing are towed on extended lines from a moving boat to draw game fish to a trailing hook using the look and action of the lures in the water as well as the water disturbance they make to attract the game fish and bring them close to the water surface for the catch. A wide variety of these trolling lures can be found rigged both in-line on so-called "daisy chains" and in umbrella-like "spreader" rigs designed to simulate a school of moving baitfish when trolled using an array of artificial lures in the form of strips called teasers bearing fish images that are particularly effective in attracting fresh water stripers and big game fish of all sorts.

Luring dredges are weighted trolling devices that have become increasingly popular in offshore fishing to create the illusion of a tightly packed school of baitfish swimming just beneath the surface of the water. These luring dredges generally comprise a plurality of metallic spreader arms of stainless steel or titanium that extend out in multiple directions from a centralized hub with a series of coupling members called "droppers" along each spreader arm that can accept and engage any number of teaser strips for deployment upon the dredge. In the past, these luring dredges were primarily found in a fixed umbrella-like structure that was bulky and cumbersome for the angler to carry and store. Improvements to the structure of these luring dredges made them somewhat collapsible either with foldable spreader arms or arms that were reversibly screwed to the centralized hub. Further improvement has also been made in the structure and operation of a collapsible dredge by making the centralized hub into separate movable segments that could alternately be loosened and tightened together to allow the hub with its spreader arms to rotate between a folded position for storage and a open position for trolling use. See U.S. Pat. No. 7,412,795 to Glynn et al.

While the prior art forms of collapsible luring dredges have been found to be generally satisfactory and effective in their fully deployed state, hub construction has been somewhat complicated causing some difficulties to anglers in the handling and manipulation of the dredge device needed to deploy and fold its collapsible structure as well as requiring separate mechanical tools for the angler to complete deployment and then return the dredge to its collapsed state. Accordingly, there is a need for an improved collapsible luring dredge device that is simpler in construction and easier to manipulate than those prior art dredges heretofore designed and developed and able to be equally or more effective in its deployed state as a trolling lure.

SUMMARY OF THE INVENTION

Accordingly, it is a general purpose and object of the present invention to provide an improved collapsible luring dredge device for use in sport fishing that effectively simulates a school of baitfish when trolled in a deployed configuration and that may be easily folded into a collapsed state for storage when not in use.

A more particular object of the present invention is to provide a collapsible luring dredge device that is simpler in construction and easier to manipulate than those prior art dredges heretofore designed and developed yet equally effective as a trolling lure for all types of offshore fishing.

Another object of the present invention is to provide a collapsible luring dredge device that is capable of exhibiting an increased the level of attraction to game fish when trolled in a deployed configuration just beneath the water surface.

Still another object of the present invention is to provide a collapsible luring dredge device that is readily rigged and implemented as a trolling lure when deployed and easily stored when not in use.

A still further object of the present invention is to provide an improved collapsible luring dredge device that is that is rugged and durable in construction, inexpensive to manufacture and maintain, and reliable in its performance.

Briefly, these and other objects of the present invention are accomplished by an improved collapsible luring dredge device comprising a hub assembly having a plurality of separate hub sections each adapted to hold an extended spreader bar and together joined into a stacked unit assembled along a central axis with a pair of spring-loaded detents disposed therein on opposite sides of the central axis. Inner surfaces of the hub sections at each end of the hub assembly are formed with a plurality of concave cavities arranged in a circular pattern intended to engage the detents as the hub sections are rotated about the central axis. The hub assembly may thus be selectively rotated and upon the spring-loaded engagement of the detents, moved through a set of registered positions between a deployed configuration wherein the spreader bars are maintained in a substantially radial pattern for trolling use and a folded configuration wherein the bars are substantially aligned for storage. The spreader bars are each provided with a plurality of dropper fasteners fitted along the length of each bar for suspending a respective number of teaser strips bearing baitfish images. Perforated end tips on each spreader bar are further provided having a series of transverse hole formations spaced apart and angularly separated to generate an increased bubble trail emanating from the ends that enhances the simulated effect of the teaser strips and increases the level of attraction to game fish.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DETAILED DESCRIPTION OF THE INVENTION

The following is a detailed description of a preferred embodiment of the present invention and the best presently contemplated mode of its production and practice. This description is further made for the purpose of illustrating the general principles of the invention but should not be taken in a limiting sense, the scope of the invention being best determined by reference to appended claims.

Referring to the drawings, the following is a list of structural components of the present collapsible luring dredge device, generally designated 10, and those associated structural elements shown employed in connection with the present invention:

10 luring dredge device;
12 hub assembly;
14 top hub section;
14a axial bore;
14b transverse bore;
14c surface cavities
16 middle hub section;
16a axial bore;
16b pair of longitudinal bores;
16c lateral bore;
18 bottom hub section;
18a axial bore;
18b lateral bore;
18c surface cavities;
20 spreader bars;
21 teaser strips;
21a baitfish images;
22 core tube;
22a wall openings;
24 swivel fitting;
24a swivel base;
24b swivel base aperture;
26 stop nut;
28 clip ring;
30 dropper fittings;
32 dropper fasteners;
34 wire clips;
36 grommets;
38 perforated end tips;
39 axial chamber;
40 transverse holes;
42 detent springs; and
44 detent balls.

Figure 1:
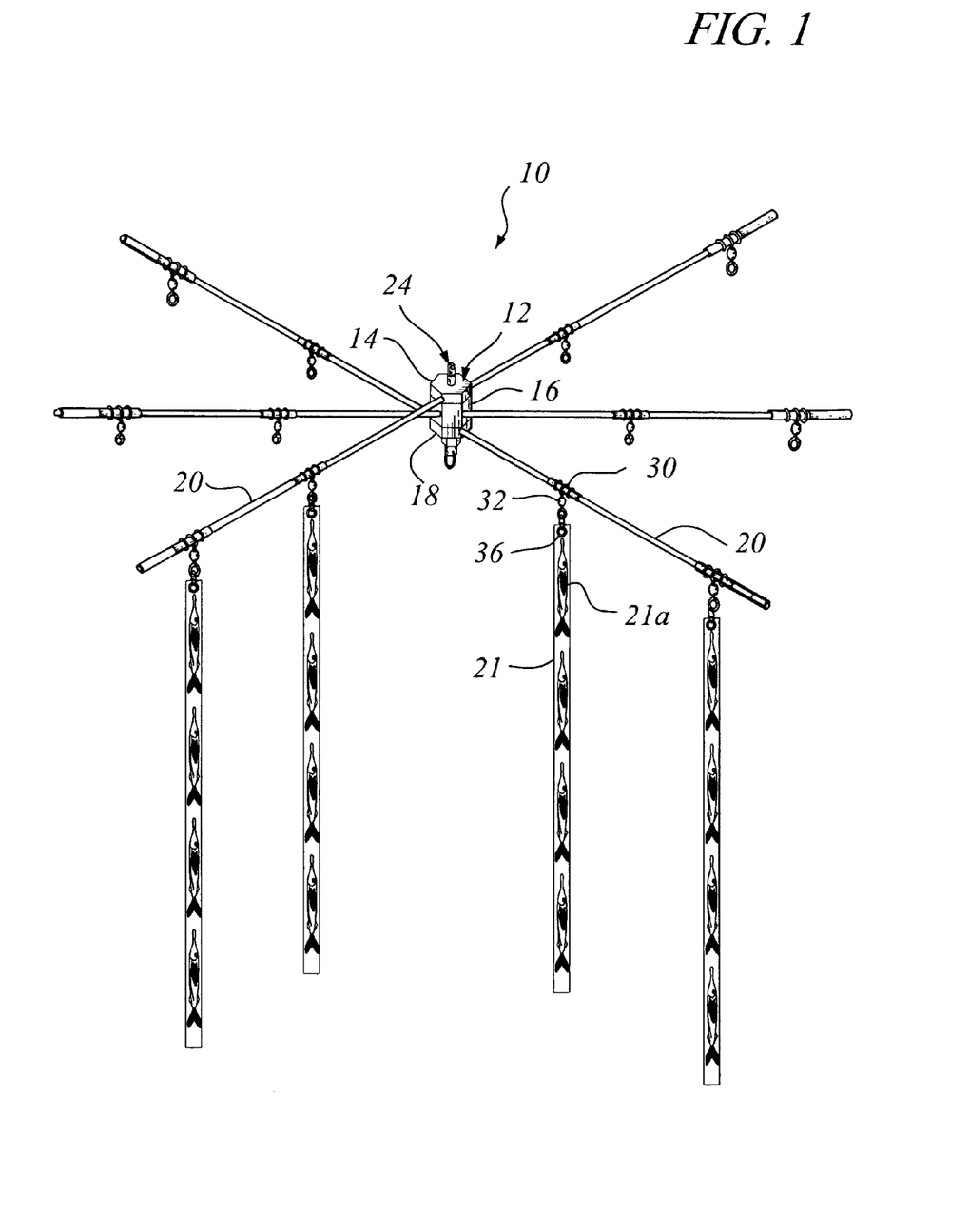
FIG. 1 is a perspective view from above of the collapsible luring dredge device made in accordance with the present invention and shown operatively deployed for trolling use.
Figure 2:
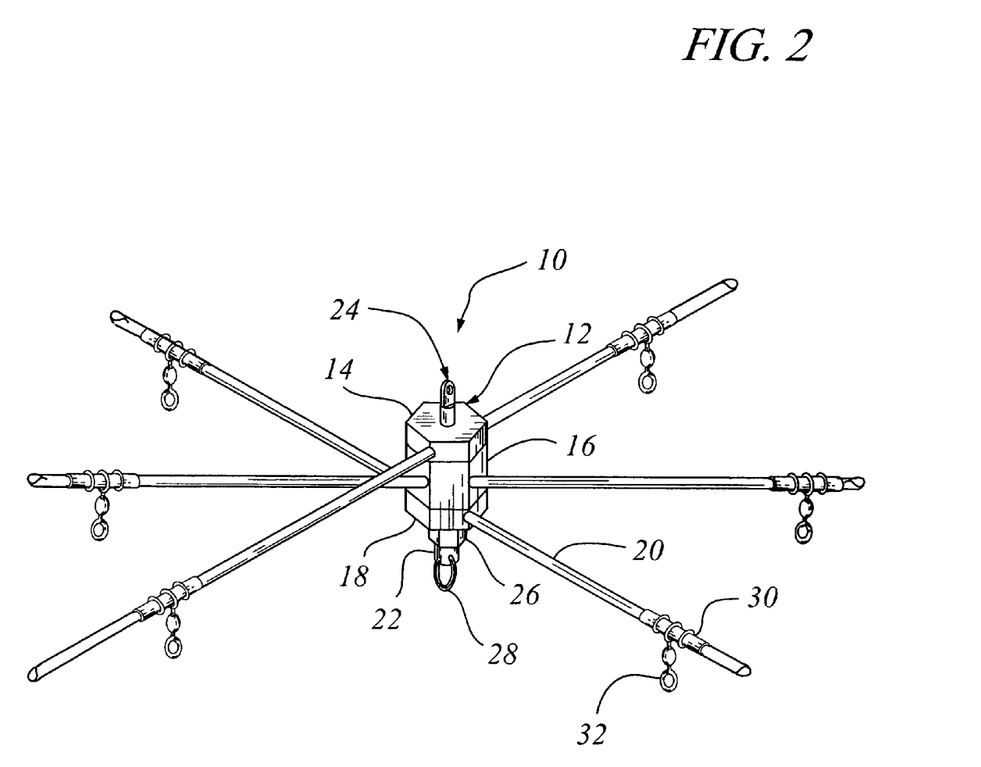
FIG. 2 is an enlarged perspective view of the central hub assembly of the deployed collapsible luring dredge device shown in FIG. 1.

Referring initially to FIGS. 1 and 2, the collapsible luring dredge device 10 of the present invention comprises a hub assembly 12 that includes separate hub sections 14, 16, and 18 assembled and joined together in a stacked unit with each hub section being fitted to hold one of a respective number of extended spreader bars 20 centrally attached and firmly supported in each section. In the hub assembly 12, the respective hub sections 14, 16 and 18 are joined along a common central axis and as described below in greater detail, adapted to rotate independently about the central axis through a distinct set of registered positions that allow the present luring dredge device 10 to be moved into a deployed configuration, as seen in FIG. 1, wherein the spreader bars 20 are set in a radial pattern with a plurality of teaser strips 21 suspended therefrom at spaced intervals for use in offshore trolling from a fishing boat (not shown). A swivel fitting 24 is rotatably connected at the top of the hub assembly 12 and formed to secure a tow line from the fishing boat to the present dredge device 10. The spreader bars 20 are rigid cylindrical rods preferably made from a stainless steel or titanium material. The length of each spreader bar 20 is fitted at selected intervals with a series of dropper fittings 30 and associated ring fasteners 32 for releasably engaging the teaser strips 21 at their upper end and maintaining their suspended positions during trolling use.

The teaser strips 21 are a type of artificial lure commercially available that consist of a laminated series of baitfish images 21a with fastener means, such as a grommet 36 and associated wire clip 34 provided at the upper end of the teaser strips for coupling each strip to the spreader bar 20. A preferred teaser strip 21 for use in the present luring dredge device 10 is a double laminated holographic strip of bright silver polyester material having die-cut baitfish images 21a in UV black color first transferred to a 1 mil base layer of a clear polyester film, then top laminated with another 1 mil clear polyester film layer. Sealing the die-cut fish images 21a between two layers of clear polyester film enhances the illusion of fish swimming in water.

Figure 3:
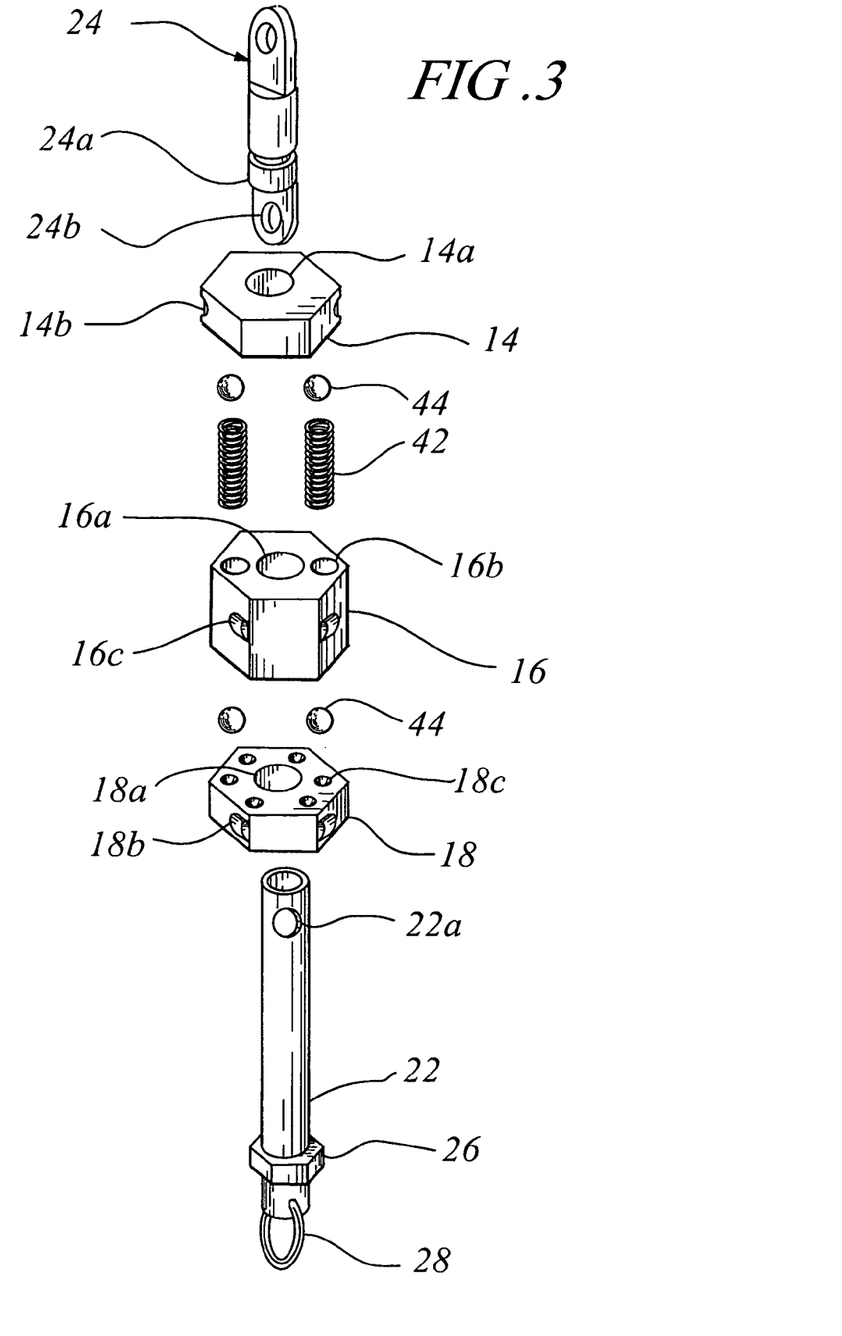
FIG. 3 is an exploded perspective view from above of the hub assembly of the present collapsible luring dredge device.

The hub assembly 12 is preferably constructed and formed from a strong and corrosion-resistant metallic material, such as stainless steel, with its component hub sections, including top hub section 14, middle hub section 16 and bottom hub section 18, each being similarly formed having a hexagonal configuration that facilitates handling and mounting of the spreader bars 20 therein. The top and bottom hub sections, 14 and 18 respectively, are substantially equal in their respective heights with each being relatively less than the typical height of the middle hub section 16, the latter, for example, being about ¾ inch or more. All of the component hub sections, 14, 16 and 18 are fabricated having axial bores 14a, 16a and 18a, best shown in FIG. 3, that are equivalent in respective diameters and centrally disposed through each hub section so that the stacked hub assembly 12 is provided with a central bore formed from the respective axial bores of the component hub sections. A cylindrical core tube 22, better seen in FIG. 3, is formed in its diameter to fit through the axial bores 14a, 16a and 18a of the respective top, middle and bottom hub sections 14, 16, and 18 and made of sufficient length to extend through the central bore of the stacked hub assembly 12 wherein the top of the core tube may be rotatably secured to the swivel fitting 24 at the top of the hub assembly, as described below in greater detail. A stop nut 26 or similar fitting secured about the core tube 22 is made to abut the lower surface of the bottom hub section 18 and set the length of extension of the core tube in the central bore of the hub assembly 12. A conventional snap or clip ring 28 is made to engage an opening formed though the bottom of the core tube 22 and serves as a means for engagement of an additional teaser strip 21 or alternate lure suspended from the hub assembly 12.

Figure 4:
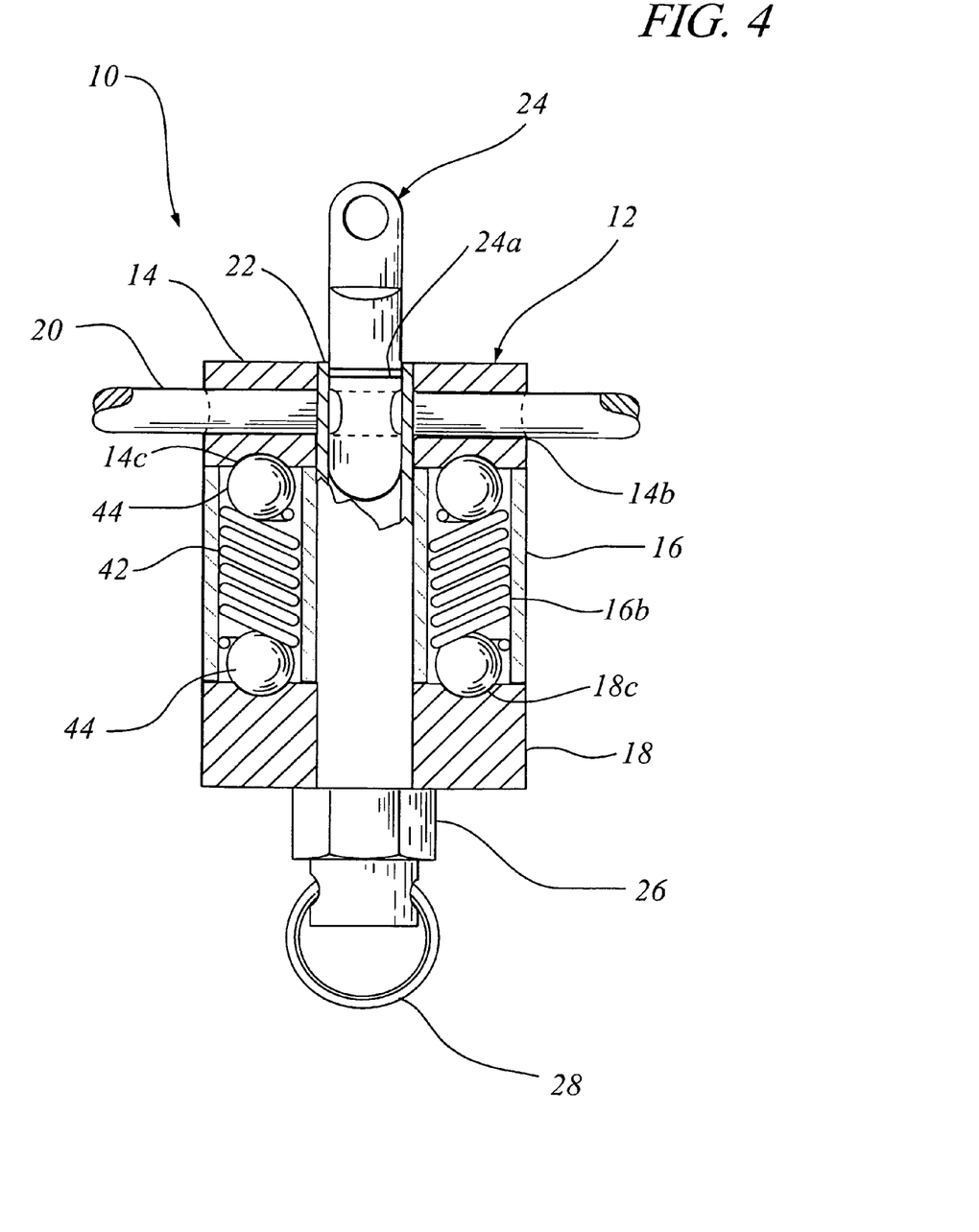
FIG. 4 is a side elevation of the hub assembly of FIG. 3 shown assembled with a portion cutaway.

Referring now to FIGS. 3 and 4 in conjunction with FIGS. 1 and 2, the respective top, middle and bottom hub sections 14, 16 and 18 are stacked coaxially in the hub assembly 12 with their respective axial bores 14a, 16a and 18a being aligned and the core tube 22 extending therethrough. In addition to the axial bore 14a made through the top hub section 14 in its height elevation, a transverse bore 14b is provided laterally through the middle of the top hub section substantially between vertices on opposite edges of the hexagonally-shaped hub section. The transverse bore 14b in the top hub section 14 is sized in its diameter to hold and support a central portion of an associated spreader bar 20 secured therein and aligned together with aperture 24b at the base of swivel fitting 24 and wall openings 22a near the top of core tube 22, secures the position of the spreader bar within the top hub section for proper rotation within the hub assembly 12. On the bottom surface of the top hub section 14, a plurality of concave surface cavities 14c, better seen in FIG. 4, are formed and arranged in a circular pattern about the bottom surface. These concave surface cavities 14c, numbering six in the present embodiment, are formed and together with a similar pattern of cavities 18c provided on the immediate facing surface of bottom hub section 18, are intended to engage spring-loaded detent balls 44 that are urged from within the middle hub section 16, as hereinafter described, as the hub sections are rotated about the central axis of the hub assembly 12.

The middle hub section 16 is further formed having a pair of longitudinal bores 16b disposed in parallel to each other and to the axial bore 16a therebetween. The longitudinal bores 16b are made to extend through the full height of the middle hub section 16, one on either side of the axial bore 16a along the center line between vertices on opposite edges of the hexagonally-shaped middle hub section. Formed having a relatively smaller diameter than that of the axial bore 16a, each of the longitudinal bores 16b is sized to fit and accommodate in and through their respective chambers a working combination of a coiled compression spring 42 and pair of detent balls 44 on opposite ends thereof that together, as described in greater detail below, are designed to interact and engage with the concave cavities 14c and 18c on the respective facing surfaces of the top and bottom hub sections 14 and 18. A transverse bore 16c is further provided laterally through the middle hub section 16 to hold and support therein an associated one of the spreader bars 20. The transverse bore 16c is formed through the middle hub section 16 about midway between the upper and lower surfaces of the hub section and substantially parallel thereto. The transverse bore 16c is made to extend between non-adjacent faces of the middle hub section 16 on one side or the other of the center line that is established across the hub section by the longitudinal bores 16b and the axial bore 16a formed therebetween. The transverse bore 16c thus is offset from but parallel to the center line of the middle hub section 16 and thereby holds the associated spreader bar 20 in corresponding position within the hub assembly 12.

The bottom hub section 18 is provided with a transverse bore 18b formed similar to that of the transverse bore 16c of the middle hub section 16 in an offset position parallel to a center line between opposite vertices on of the hexagonally-shaped bottom hub section. Like both transverse bores 14b and 16c made in the respective top and middle hub sections 14 and 16, the transverse bore 18b in the bottom hub section 18 is sized in its diameter to hold and support a central portion of an associated spreader bar 20 secured therein. The transverse bore 18b is formed at a midway level between the upper and lower surfaces of the bottom hub section 18 and substantially parallel thereto and extends between non-adjacent faces of the bottom hub section parallel to the intermediate facing surface therebetween thereby establishing its offset but parallel position with respect to the center line of the hub assembly 12. On the upper surface of the bottom hub section 18, a plurality of concave surface cavities 18c are formed and arranged in a circular pattern about the upper surface. These concave surface cavities 18c, numbering six in the present embodiment, are formed adjacent to the vertices at each edge of the hexagonally-shaped bottom hub section 18 and are intended for alignment with the similar pattern of cavities 14c provided on the downwardly facing surface of top hub section 14 so that aligned cavities on both of the hub sections may engage the spring-loaded detent balls 44 disposed at the opposite ends of the compression springs 42 chambered within the longitudinal bores 16b of the middle hub section 16, as best seen in FIG. 4.

The compression springs 42 are cylindrically shaped in their coiled construction and sized in their length and outer diameter to fit completely within the chambers of longitudinal bores 16b in their normal uncompressed state. Made preferably of corrosion-resistant spring steel, the compression springs 42 are finished at each end to engage the spherical surface of the detent balls 44 and hold the balls in place to engage aligned surface cavities 14c and 18c at opposite ends of the longitudinal bore 16b. The detent balls 44 are sized in their diameter, typically being about ¼ inch, to substantially match the radius of the surface cavities 14c and 18c and provide a firm engagement therebetween under the force applied by the associated compression spring 42. This working combination of the coiled compression spring 42 and detent balls 44 chambered in the longitudinal bores 16b of the middle hub section thus serves to releasably lock the middle and bottom hub sections 16 and 18 relative to the top hub section 14 at selected registered positions in rotation established by the pattern of the aligned set of concave cavities 14c and 18c on the respective surfaces of the top and bottom hub sections.

The swivel fitting 24 is made to rotate within a base member 24a that is sized to fit within the top of core tube 22 and allow the base aperture 24b to align with the wall openings 22a through the core tube near the top edge thereof. As best seen in FIG. 4, this alignment allows passage of the associated spreader bar 20 within the top hub section 14 and provides for full rotation of the hub assembly 12 about the core tube and upon the swivel fitting.

Figure 5:
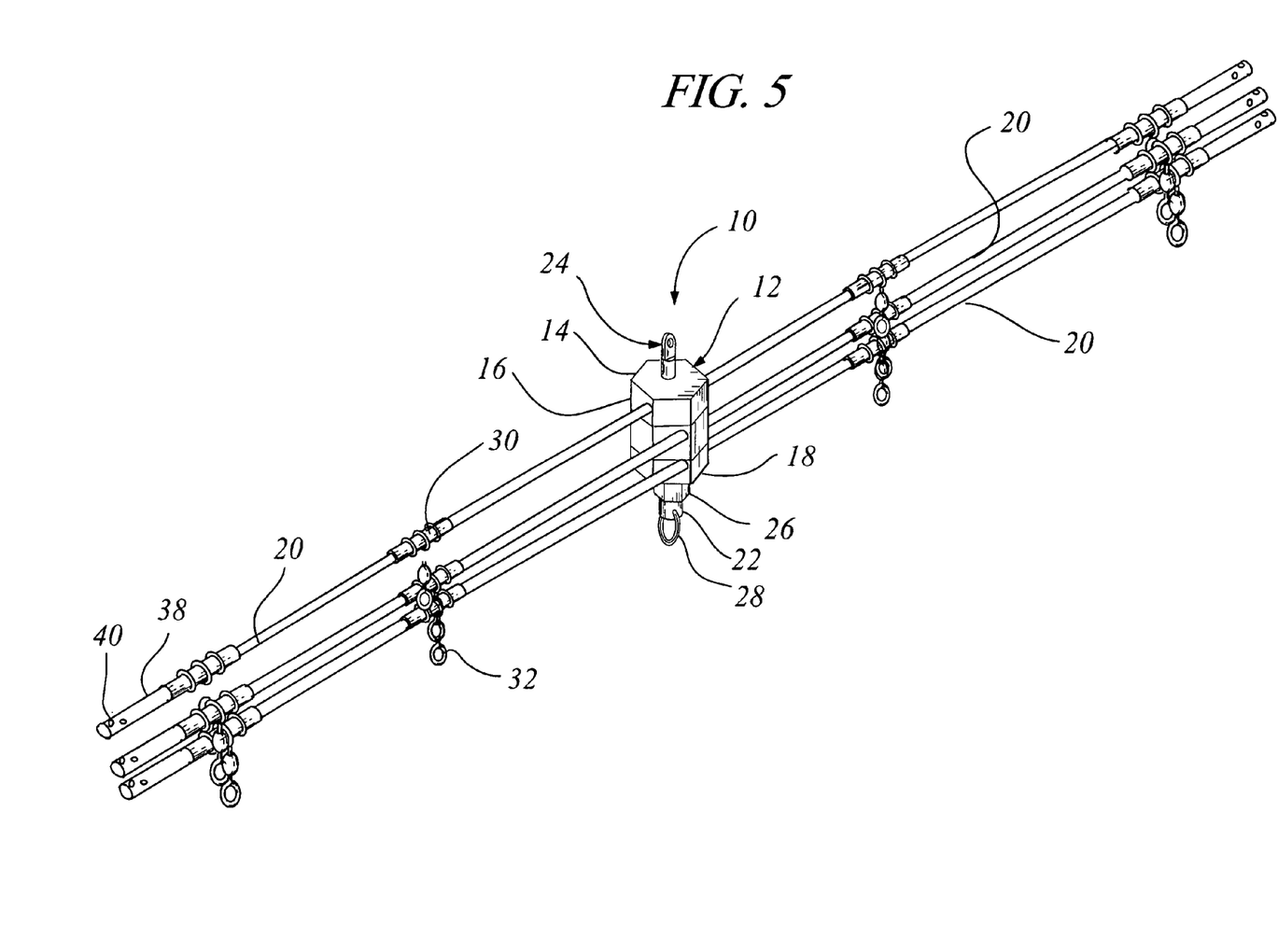
FIG. 5 is a perspective view of the present luring dredge device shown collapsed into its folded configuration.

Referring now to FIG. 5, the present luring dredge device 10 (shown without teaser strips 21) is collapsible into its folded configuration upon separate rotational turns of the middle hub section 16 and bottom hub section 18 about core tube 22 and relative to the top hub section 14 so that the associated spreader bars 20 held by each hub section are substantially aligned in a vertical plane upon the hub assembly 12. The separate hub sections 14, 16 and 18 are rotated in a distinct, stepwise movement relative to each other with a twisting or turning motion applied to the respective hub sections that overcomes the forced engagement of the spring-loaded detent balls 44 within an aligned set of surface cavities 14c and 18c, moving the detent balls from one set of the aligned surface cavities on the inner facing surfaces of the top and bottom hub section 14 and 18 to another until the folded configuration is reached. The outward spring-loaded forces exerted upon the detent balls 44 by compression spring 42 firmly engage the balls within each of the respective surface cavities 14c and 18c in the rotational sequence established by their circular pattern, essentially locking hub assembly 12 and the relative positions of the hub sections 14, 16 and 18 in place until a further twisting motion is applied thereto. This spring-loaded engagement of the detent balls 44 within the respective surface cavities 14c and 18c on each of the top and bottom hub sections 14 and 18 further maintain the performance and operation of the present luring dredge device 10 when in its deployed configuration, as seen in FIG. 1, by resisting the forces that develop in the water during trolling that might breakdown the radial pattern of the spreader bars 20 about the hub assembly 12.

Figure 6:
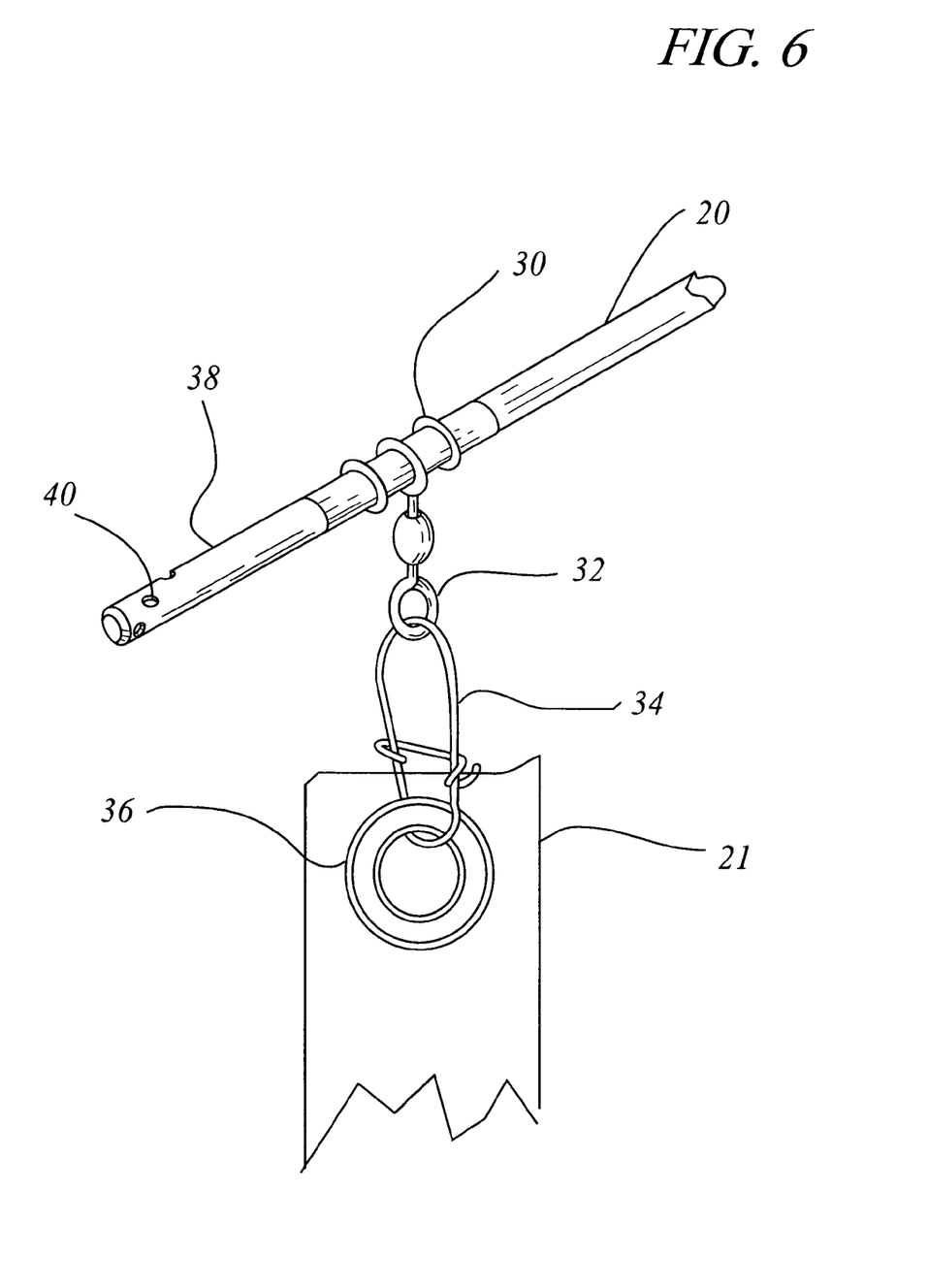
FIG. 6 is an enlarged perspective view of a perforated end tip disposed on the collapsible luring dredge device in accordance with the present invention.

Referring to FIG. 6, a perforated end tip 38 is attached to the outer ends of one or more of the spreader bars 20, each end tip having a plurality of transverse holes 40 spaced apart along the length of the end tip and made to project through and around the end tip at equally separate angles to generate an increased bubble trail or "smoke" emanating from the ends of the spreader bars that enhances the simulated effect of the teaser strips and increases the level of attraction to game fish. The size and number of the transverse holes 40 in the perforated end tip 38 will affect the amount of "smoke" generated in the water during trolling. The size of the transverse holes 40 may vary depending upon the diameter and length of the end tip 38 being employed, with a standard hole size being relatively small in diameter, typically about 1/16 inch. The number of the transverse holes 40 made through the end tip 38 may also be altered with the number of holes selected establishing the angular or radial separation of the holes projections through the end tip 38. In a preferred arrangement of transverse holes 40 formed through end tip 38, a series of three holes are formed and made to project 60° apart around the end tip.

Therefore, it is apparent that the described invention provides an improved collapsible luring dredge device for use in sport fishing that effectively simulates a school of baitfish when trolled in a deployed configuration and that may be easily folded into a collapsed state for storage when not in use. In particular, the present invention provides a collapsible luring dredge device that is simpler in construction and easier to manipulate than those prior art dredges heretofore designed and developed yet equally effective as a trolling lure for all types of offshore fishing. The described collapsible luring dredge device has features capable of exhibiting an increased level of attraction to game fish when trolled in a deployed configuration just beneath the water surface. In addition, the disclosed collapsible luring dredge device can be readily rigged and implemented as a trolling lure when deployed and easily stored when not in use. Furthermore, the disclosed collapsible luring dredge device is rugged and durable in construction, inexpensive to manufacture and maintain, and reliable in its performance.

Obviously, other embodiments and modifications of the present invention will readily come to those or ordinary skill in the art having the benefit of the teachings presented in the foregoing description and drawings. Alternate embodiments of different shapes and sizes, as well as substitution of known materials or those materials that may be developed at a future time to perform the same function as the present described embodiment are therefore considered to be part of the present invention. Accordingly, it is understood that this invention is not limited to the particular embodiment described, but rather is intended to cover modifications within the spirit and scope of the present invention as expressed in the appended claims.

What is claimed:

1. A luring dredge device for use in trolling water for fish, comprising:

hub means including a plurality of hub sections joined coaxially in a stacked assembly with each of said hub sections being adapted to rotate independently about a common central axis, the hub sections including a pair of end hub sections at either end of the assembly and an intermediate hub section disposed therebetween, the end hub sections having respective facing surfaces each formed having a plurality of cavities aligned in a circular pattern and the intermediate hub section having a pair of bores formed therethrough in parallel to the central axis and on opposite sides thereof; and spring-loaded detent means operatively disposed within the respective bores of the intermediate hub sections to engage aligned cavities on the facing surfaces of the hub sections at either end of the stacked assembly as the hub sections are rotated about the common central axis so that the hub sections may be selectively moved through a set of registered positions.

2. A luring dredge device according to claim 1, further comprising:

a plurality of longitudinal spreader bars each connected to a respective one of the hub sections and made to extend therefrom.

3. A luring dredge device according to claim 2, further comprising:

a perforated end tip attached to the outer end of one or more of the longitudinal spreader bars, each end tip having a plurality of holes made transversely through the end tip in separate angular directions along the length thereof.

4. A luring dredge device according to claim 3, wherein the plurality of holes of said end tip are spaced apart equally along the length of each tip and made to project through and around said end tip at equally separate angles.

5. A luring dredge device according to claim 3, further comprising:

a plurality of luring strips bearing a series of holographic images of baitfish, each of the strips being releasably engaged to suspend from the longitudinal spreader bars.

6. A luring dredge device according to claim 5, wherein said strips are laminated in construction of a bright silver polyester film material with the baitfish images thereon being die-cut in UV black color and sealed between separate layers of a clear polyester film.

7. A luring dredge device according to claim 1, wherein said spring-loaded detent means comprises:

a pair of compression spring members each chambered within the respective bores of the intermediate hub section on opposite sides of the common central axis; and a plurality of detent ball members each disposed at opposite ends of said pair of compression spring members to engage aligned cavities on the facing surfaces of the end hub sections.

8. A luring dredge device according to claim 7, wherein said hub means further comprises:

a tubular member operatively mounted within the stacked assembly of the hub sections along the common central axis thereof;

a swivel fitting rotatably connected to said tubular member at the top of the stacked assembly of the hub sections; and a ring member coupled to said tubular member at the bottom of the stacked assembly of the hub sections.

9. A collapsible dredge device used in trolling for fish, comprising:

a plurality of hub sections joined coaxially in a stacked hub assembly with each of said hub sections being adapted to rotate independently about a common central axis, said plurality of hub sections including a pair of end hub sections at either end of the hub assembly and an intermediate hub section disposed therebetween, the end hub sections having respective facing surfaces each formed having a plurality of cavities aligned in a circular pattern and the intermediate hub section having a pair of bores formed therethrough in parallel to the central axis and on opposite sides thereof;

a plurality of longitudinal bars each connected to a respective one of said hub sections and made to extend therefrom; and spring-loaded detent means operatively disposed within the respective bores of the intermediate hub sections to engage aligned cavities on the facing surfaces of the hub sections at either end of the assembly as said hub sections are selectively rotated about the common central axis thereby moving the dredge between a deployed configuration wherein the bars are maintained in a radial pattern for trolling use and a folded configuration wherein the bars are aligned for storage.

10. A collapsible dredge device according to claim 9, wherein said spring-loaded detent means comprises:

a pair of compression spring members each chambered within the respective bores of the intermediate hub section on opposite sides of the common central axis; and a plurality of detent ball members each disposed at opposite ends of said pair of compression spring members to engage aligned cavities on the facing surfaces of the end hub sections.

11. A collapsible dredge device according to claim 10, further comprising:

a tubular member operatively mounted within the stacked assembly of said hub sections along the common central axis thereof;

a swivel fitting rotatably connected to said tubular member at the top of the stacked assembly of said hub sections; and a ring member coupled to said tubular member at the bottom of the stacked assembly of said hub sections.

12. A collapsible dredge device according to claim 10, wherein said longitudinal bars are made perforated along a length of the respective outer ends thereof, each of the perforated lengths of said longitudinal bars having a plurality of holes made transversely therethrough in separate angular directions.

13. A collapsible dredge device according to claim 12, wherein the plurality of holes along the perforated lengths of said longitudinal bars are spaced apart equally along the respective lengths and made to project therethrough at equally separate angles.

14. A collapsible dredge device according to claim 9, further comprising:

a plurality of luring strips bearing a series of holographic images of baitfish, each of said strips being releasably engaged to suspend from said longitudinal bars at selected intervals along the lengths thereof.

15. A collapsible dredge device according to claim 14, wherein said strips are laminated in construction of a bright silver polyester film material with the baitfish images thereon being die-cut in UV black color and sealed between separate layers of a clear polyester film.

16. In a dredge device of the type used in trolling waters to lure fish wherein a plurality of longitudinal spreader bars are adapted to extend in radial directions from a centralized hub member with one or more luring strips bearing images of baitfish being suspended from the spreader bars, the improvement comprising:

a perforated bar section attached at the outer end of one or more of the longitudinal spreader bars, each perforated bar section having a plurality of holes made transversely therethrough in separate angular directions along the length thereof.

17. The improvement of claim 16 wherein the plurality of holes of said perforated bar section are spaced apart equally along the length of each section and made to project through and around said section at equally separate angles.

\* \* \* \* \*